(12) United States Patent
Wiegelmann et al.

(10) Patent No.: US 9,211,813 B2
(45) Date of Patent: Dec. 15, 2015

(54) SEAT CUSHION ARRANGEMENT AND VEHICLE SEAT WITH THE SEAT CUSHION ARRANGEMENT

(71) Applicant: GM GLOBAL TECHNOLOGY OPERATIONS LLC, Detroit, MI (US)

(72) Inventors: Joerg Wiegelmann, Bodenheim (DE); Guenter Fleckenstein, Kleinkahl (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 70 days.

(21) Appl. No.: 14/109,289

(22) Filed: Dec. 17, 2013

(65) Prior Publication Data

US 2014/0183926 A1 Jul. 3, 2014

(30) Foreign Application Priority Data

Dec. 17, 2012 (DE) .......................... 10 2012 024 637

(51) Int. Cl.
- *B60N 2/58* (2006.01)
- *B60N 2/02* (2006.01)
- *B60N 2/64* (2006.01)

(52) U.S. Cl.
CPC ............ *B60N 2/0284* (2013.01); *B60N 2/5858* (2013.01); *B60N 2/646* (2013.01); *B60N 2205/30* (2013.01)

(58) Field of Classification Search
CPC .. B60N 2205/30; B60N 2/5858; B60N 2/646; B60N 2/0284
USPC .................... 297/311, 452.48, 452.39, 452.56
See application file for complete search history.

(56) References Cited

U.S. PATENT DOCUMENTS

| | | | |
|---|---|---|---|
| 5,171,062 A | 12/1992 | Courtois | |
| 7,527,217 B2 * | 5/2009 | Burnett | ...................... 242/597.5 |
| 2008/0157578 A1 | 7/2008 | Snyder | |
| 2008/0174162 A1 | 7/2008 | Becker et al. | |
| 2009/0039690 A1 * | 2/2009 | Simon et al. | ............... 297/344.1 |

(Continued)

FOREIGN PATENT DOCUMENTS

| | | |
|---|---|---|
| DE | 19943707 A1 | 3/2001 |
| DE | 102008028729 A1 | 3/2009 |

(Continued)

OTHER PUBLICATIONS

Search Report issued in GB1319842.9 completed Jun. 18, 2014.

(Continued)

*Primary Examiner* — David R Dunn
*Assistant Examiner* — Timothy J Brindley
(74) *Attorney, Agent, or Firm* — Ingrassia Fisher & Lorenz PC

(57) ABSTRACT

A seat cushion arrangement is provided for a vehicle seat with a first and a second pad region. The first pad region has a first pad cover and the second pad region has a second pad cover. The first and second pad region in a base position of the second pad region are arranged adjacent to one another. A gap is arranged between the first and the second pad region. The second pad region is able to be transferred relative to the first pad region from the base position into a distance position, in which a distance is formed between the first and second pad region, so that the seat cushion arrangement is enlarged in a seat depth. The second pad cover comprises a bridging section, which in the distance position of the second pad region is constructed for bridging the distance.

13 Claims, 2 Drawing Sheets

(56) References Cited

U.S. PATENT DOCUMENTS

| | | | |
|---|---|---|---|
| 2010/0213215 A1* | 8/2010 | Laible | 222/185.1 |
| 2010/0263116 A1* | 10/2010 | Pinizzotto et al. | 4/324 |
| 2011/0248538 A1* | 10/2011 | Harper et al. | 297/311 |
| 2012/0267928 A1* | 10/2012 | Mankame et al. | 297/284.4 |
| 2013/0257134 A1* | 10/2013 | Seki | 297/452.48 |
| 2014/0183926 A1* | 7/2014 | Wiegelmann et al. | 297/452.48 |
| 2014/0203606 A1* | 7/2014 | Line et al. | 297/311 |

FOREIGN PATENT DOCUMENTS

| | | |
|---|---|---|
| DE | 102008004121 A1 | 7/2009 |
| DE | 102009019031 A1 | 10/2010 |
| DE | 102009019033 A1 | 10/2010 |
| DE | 102010007829 A1 | 11/2010 |
| DE | 102010039027 A1 | 2/2012 |
| FR | 2931742 A1 | 12/2009 |
| GB | 327448 A | 4/1930 |
| GB | 2252723 A | 8/1992 |
| GB | 2501982 A | 11/2013 |

OTHER PUBLICATIONS

German Patent Office, German Patent Search Report for Application No. 102012024637.4 dated Aug. 2, 2013.

\* cited by examiner

SEAT CUSHION ARRANGEMENT AND VEHICLE SEAT WITH THE SEAT CUSHION ARRANGEMENT

CROSS-REFERENCE TO RELATED APPLICATION

This application claims priority to German Patent Application No. 10 2012 024 637.4, filed Dec. 17, 2012, which is incorporated herein by reference in its entirety.

TECHNICAL FIELD

The technical field relates to a seat cushion arrangement and a vehicle seat with the seat cushion arrangement.

BACKGROUND

Several vehicle seats offer the possibility of enlarging a seat depth of a seat pad and thereby adapting to a physical size of an occupant. For this, the seat pads have pad regions which are movable relative to one another. For example, the published patent application DE 10 2010 039 027 A1, which indeed forms the nearest prior art, describes a seat for a motor vehicle, in which the occurrence of a gap is prevented on extending a thigh support by the deformation of the thigh support. This is achieved in that a front end of a seat cover is held in a taut state via at least one spring element in each position of the thigh support and that the seat cover covers a gap between a front end of the seat cushion and a rear end of the thigh support. In view of the foregoing it is desirable to provide a functionally improved seat cushion arrangement. In addition, other objects, desirable features and characteristics will become apparent from the subsequent summary and detailed description, and the appended claims, taken in conjunction with the accompanying drawings and this background.

SUMMARY

A seat cushion arrangement is provided for a vehicle seat. The vehicle seat is preferably able to be integrated into an automobile or a truck. In particular, the vehicle seat is constructed as a front seat or a rear seat of a rear bench seat of the vehicle. The seat cushion arrangement comprises a first and a second pad region. The first pad region has a first pad cover and the second pad region has a second pad cover. Preferably, the first and second pad region form together a seat cushion of the vehicle seat, on which an occupant of the vehicle sits. In particular, the second pad region is arranged at a free end of the seat cushion. For example, the knees of an occupant who is sitting on the seat cushion contact the second pad region.

The second pad region is constructed to be transferred from a base position into a distance position. In the base position of the second pad region, the first and second pad region are arranged adjacent to one another. A gap is arranged between the first and second pad section. Preferably, the gap has a maximum width of approximately 15 millimeters, preferentially a maximum width of approximately 10 millimeters, in particular a maximum width of approximately 5 millimeters. Optionally, the second pad section can contact the first pad section at least partially or at least in sections.

The second pad region is able to be transferred relative to the first pad region from the base position into the distance position. In the distance position, a distance is formed between the first and second pad region, so that the seat cushion arrangement is enlarged in a seat depth. The distance has a width of preferably more than approximately 30 mm, in particular more than approximately 50 mm, especially more than approximately 70 mm. Optionally, the distance has a maximum width of approximately 330 mm, preferably of approximately 320 mm, in particular of approximately 305 mm.

The second pad cover of the second pad region comprises a bridging section, in particular the bridging section is connected with the second pad cover in one piece and/or in a single material. The bridging section is constructed in the space position of the second pad section for bridging the distance. In particular, the bridging section completely covers the distance which has arisen between the first and second pad region. Optionally, the bridging section forms an intermediate section of the seat surface.

The seat cushion arrangement comprises a guide device for guiding the bridging section. The guide device is arranged in the gap between the first and second pad section. Optionally, the guide channel guides the bridging section parallel or substantially parallel to a front face of the first and/or second pad region. Preferably, the guide device is constructed to guide the bridging section in a single layer in a region which is arranged between the seat surface and an upper outlet opening of the guide device. In particular, the bridging section emerges in a single layer out from the upper outlet opening and is moved, on the transferring of the second pad region from the base position into the distance position, gradually in a single layer over the distance which is arising.

Through the preferably single-layered guidance and the preferably single-layered emergence of the bridging section from the guide device, in particular in the base position of the second pad region it can be prevented that a fold or a recess forms in the gap, in which dust or crumbs collect. This would be the case in particular if the bridging section were received in two or multiple layers in the gap. Through the fact that the bridging section bridges the distance in the distance position of the second pad region, in an advantageous manner a smooth connection is produced between the two pad covers. As a whole, a visually attractive and high-quality impression can be achieved for the seat cushion arrangement.

In an embodiment, the guide device is fastened to the first pad region. Alternatively or optionally in addition the guide device is fastened to the first pad cover. In particular, the guide device is fastened in a form-fitting and/or force-fitting manner, for example by sewing or hooking and/or catching, on the first pad region and/or first pad cover. Alternatively, it is possible that the guide device is glued to the first pad region and/or to the first pad cover. Therefore, a favorably priced fastening can be realized of the guide device in the gap.

An embodiment makes provision that the guide device in its longitudinal extent extends along the gap. Preferably, the guide device has a length which is adapted to a seat width of the first and/or second pad section or is equal thereto. For example, the length of the guide device is at least approximately 85%, preferably at least approximately 90%, especially at least approximately 95% of the seat width of the first and/or second pad section. This leads to the bridging section being guided reliably by the guide device over a majority of the seat width or over the entire seat width.

In an embodiment, the guide device has a height which is adapted to a height of the first pad section or is equal thereto. Preferably, at least approximately 70 percent, in particular at least approximately 80 percent, especially at least approximately 90 percent of the front face of the first pad region is covered by the guide device. By the utilization of a majority of the height of the first pad section or of a total height of the first pad section, in particular in the base position of the second pad region more length of the bridging section can be received in the guide device and stored therein. This entails the advantage that the bridging section is received free of folds in the guide device over the majority of the height of the first pad section or over its total height, and has no creases on emerging from the upper outlet opening of the guide device.

In an embodiment, the guide device has the upper outlet opening, directed to the seat surface of the seat cushion arrangement, through which the bridging section is moved out, when the second pad region is transferred into the distance position. It is preferred that the guide device is arranged offset downwards in a direction facing away from a seat surface of the first pad region. It is particularly preferred that the upper outlet opening of the guide device, preferably in the optimum comfort range, is arranged offset downwards by optionally approximately 50 mm, in particular approximately 35 mm, especially by approximately 25 mm to the seat surface of the first pad region. It is thereby achieved that the occupant who is sitting on the vehicle seat does not feel the guide device, or respectively is not pressed by it when sitting.

An embodiment makes provision that the guide device is constructed as a retaining strip or as a retaining bead. Preferably, the retaining strip or the retaining bead forms together with the first pad region and/or with the first pad cover a guide channel for the bridging section. Alternatively, the guide device is constructed as a flat housing with a first and a second housing side. In particular, the two housing sides form together a guide channel for the bridging section. Through the elongated and narrow configuration of the guide device as a holding strip, holding bead or flat housing, this can be integrated in the gap in a space-saving manner.

For example, the guide device is formed from a plastic material. Alternatively, it is possible that that the guide device is formed from a firm fabric material or from a light metal. Therefore, the guide device can be integrated in the seat cushion arrangement in a weight-saving manner. As a whole, a favorably priced guide device can be realized. It is particularly preferred that the guide channel has the upper outlet opening and a lower inlet opening. Preferably, the bridging section arrives through the lower inlet opening into the guide channel and emerges therefrom again at the upper outlet opening, so that it can bridge the distance.

In an embodiment, the guide channel is constructed for the one and/or repeated deflection of the bridging section by an angle of at least approximately 70 degrees, preferably at least approximately 80 degrees, especially at least approximately 90 degrees. In particular, the bridging section is deflected through the guide channel once or several times in a maximum angle of approximately 120 degrees. For example, the deflection of the bridging section takes place at the emergence from the upper outlet opening and/or on entry into the lower inlet opening, and vice versa.

An embodiment makes provision that the seat cushion arrangement comprises a tensioning device. Preferably, the tensioning device is arranged in a space beneath the first pad section. Alternatively, the tensioning device can also be arranged in a space under the second pad region, when the latter is in the base position. For example, the tensioning device comprises at least one elastic element which is constructed as a tension spring or as a rubber-elastic band. Therefore, the tensioning device can be space-saving and in a favorably priced embodiment can be integrated into the seat cushion arrangement. Preferably, the bridging section is connected at a free end with the tensioning device or respectively is fastened thereon.

In an embodiment, the tensioning device is constructed to pre-tension the bridging section, when the second pad region is transferred from the base position into the distance position or when the bridging section occupies the distance position. Through the pre-tensioning, the freedom from folds and a visually attractive impression of the bridging section on bridging the distance can be guaranteed. In particular, the tensioning device is constructed for the moving back or drawing back of the bridging section, when the second pad region is transferred from the distance position into the base position. Therefore, the bridging region is moved smoothly and without falling into folds through the upper outlet opening into the guide channel, through the latter and downwards through the lower inlet opening in the direction of the space beneath the first pad region. Optionally in addition, the tensioning device is constructed for the tensioned retention of the bridging section in the guide channel and/or in the space beneath the first pad region, when the second pad region occupies the base position. In summary, the bridging section is tensioned by the fastening on the tensioning device in each position of the second pad region and is constructed free of folds.

In an embodiment, the guide channel and optionally in addition the tensioning device and/or the space under the first or alternatively second pad region form one or more receiving regions for the bridging section. In particular, the bridging section is received in the receiving region or receiving regions in the base position of the second pad section. It is preferred that the bridging section projects out partially or for the most part from the receiving region or receiving regions and covers the distance when the second pad section occupies the distance position.

BRIEF DESCRIPTION OF THE DRAWINGS

The present invention will hereinafter be described in conjunction with the following drawing figures, wherein like numerals denote like elements, and:

FIG. 1b is a sectional view along the section line A-A through the seat cushion arrangement of FIG. 1a;

FIG. 2b is a sectional view along the section line B-B through the seat cushion arrangement of FIG. 1a.

DETAILED DESCRIPTION

The following detailed description is merely exemplary in nature and is not intended to limit application and uses. Furthermore, there is no intention to be bound by any theory presented in the preceding background or the following detailed description.

Figure 1A:
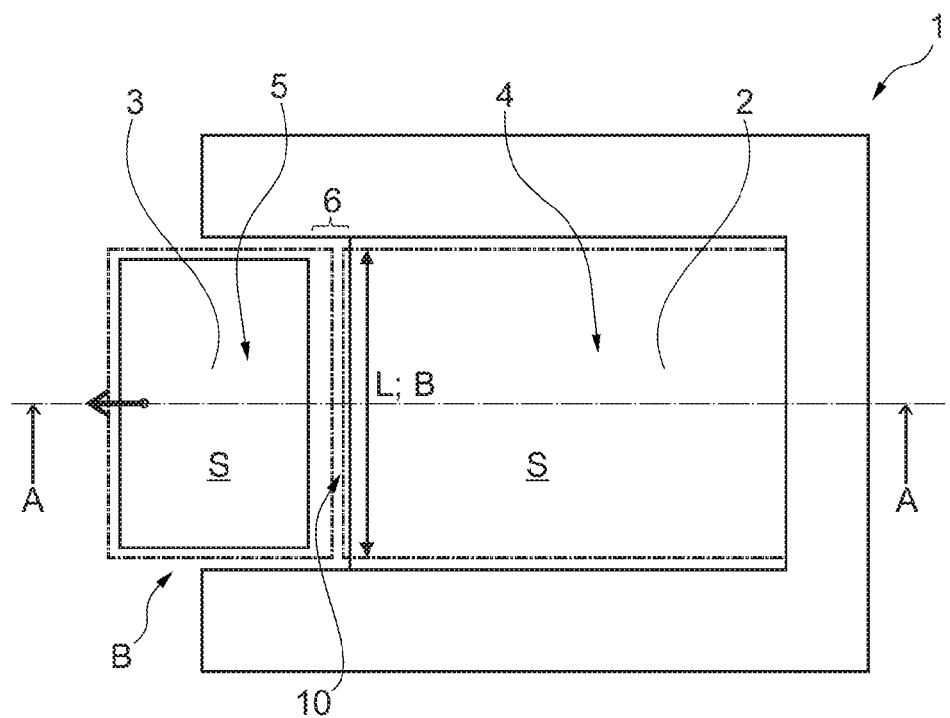
FIG. 1a is a top view from above onto a seat cushion arrangement with a second pad region in a base position.

FIG. 1a shows a top view onto a seat surface S of a seat cushion arrangement 1 for a vehicle seat, which is able to be integrated in a vehicle. The seat cushion arrangement 1 comprises a first and a second pad region 2, 3, which are arranged adjacent to one another. The first pad region 2 has a first pad cover 4, and the second pad region 3 has a second pad cover 5. Between the two pad regions 2, 3 a gap 6 of preferably up to a maximum of approximately 15 mm, in particular up to a maximum of approximately 10, especially up to a maximum of approximately 5 mm is arranged.

Figure 2A:
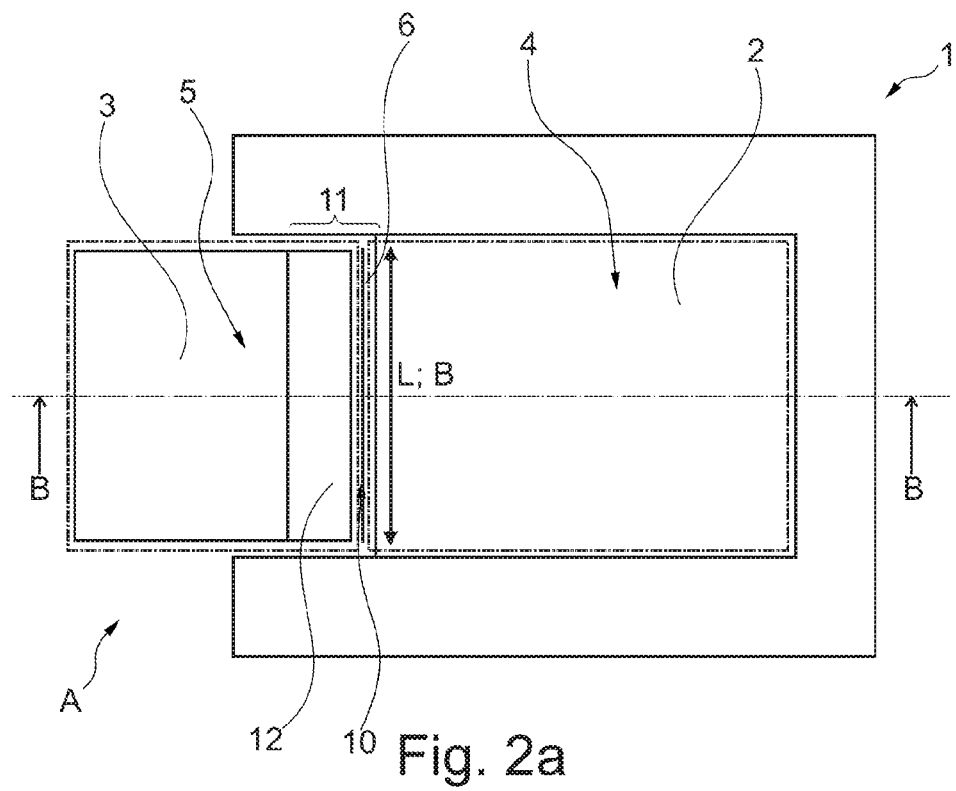
FIG. 2a is a top view from above onto a seat cushion arrangement with a second pad region in a distance position.
Figure 2B:
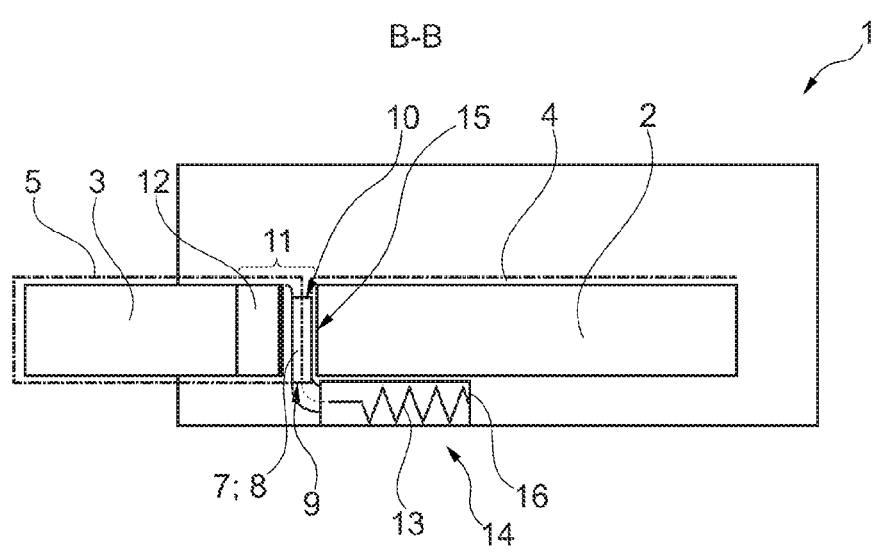

The second pad region 3 occupies a base position B when it is arranged adjacent to the first pad region 2. In order to enlarge a seat depth of the seat cushion arrangement 1, the second pad region 3 is able to be transferred relative to the first pad region 2 from the base position B into a distance position A (FIG. 2a, FIG. 2b). The seat cushion arrangement 1, in which the second pad region 3 occupies the distance position A, is shown in FIG. 2a. In the distance position 2 a distance 11 (FIG. 2a, FIG. 2b) is arranged between the first and second pad region 2; 3. The distance 11 has a width of preferably more than approximately 30 mm, in particular more than approximately 50 mm, especially more than approximately 70 mm and up to a maximum of approximately 330 mm, in particular up to a maximum of approximately 320 mm, especially up to a maximum of approximately 305 mm.

The second pad cover 3 comprises a bridging section 12 for bridging the distance 11, when the second pad section 3 occupies the distance position A. The bridging section 12 is connected in one piece and/or in a single material with the second pad cover 3, in particular the bridging section 12 forms a component of the second pad cover 5.

Figure 1B:
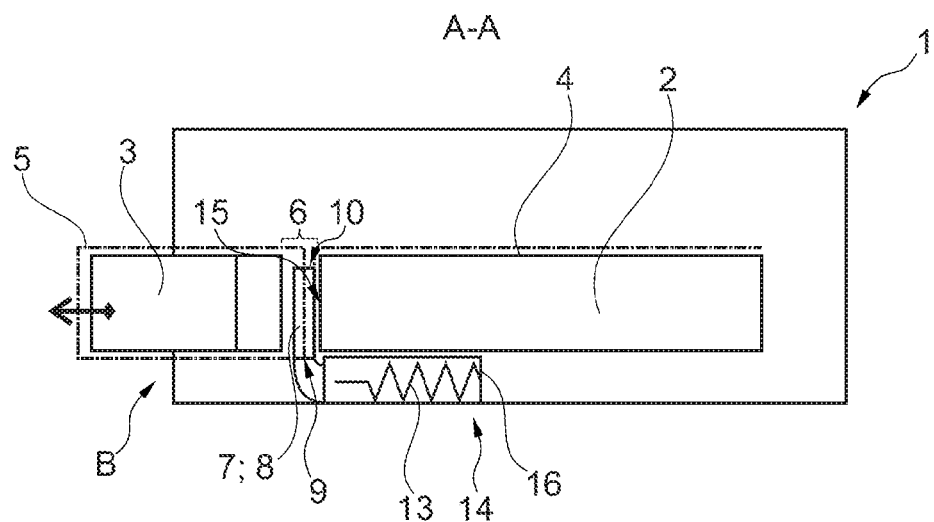

FIG. 1b shows a sectional view of the seat cushion arrangement 1 of FIG. 1a along the section line A-A, whilst FIG. 2b shows a sectional view of the seat cushion arrangement 1 of FIG. 2a along the section line B-B. In the gap 6 between the first and second pad region 2; 3 a guide device 7 is arranged. This has a height which corresponds to a seat height of the first and/or second pad region 2; 3, however is arranged offset downwards from the seat surface S.

According to FIG. 1a the guide device 7 extends in its longitudinal extent along the gap 6. It has a length which corresponds to a seat width B of the first and/or second pad region 2; 3. The guide device 7 covers a front face 15 of the first pad region 2 at preferably at least approximately 70 percent, in particular at least approximately 80 percent, especially at least approximately 90 percent.

The guide device 7 is constructed as a strip or as a bead, which together with the first pad region 2 and/or with the first pad cover 4 forms a guide channel 8 for the bridging section 12. Alternatively, the guide device 7 is constructed as a flat housing with a first and second housing side, wherein the two housing sides form with one another the guide channel 8 for the bridging section 12.

The guide channel 8 has a lower inlet opening 9 facing away from the seat surface S and directed downwards, and an upper outlet opening 10 directed upwards to the seat surface S for the bridging section 12. The guide device 7 is integrated into the gap 6 so that the upper outlet opening 10 is arranged offset downwards with respect to the seat surface S by preferably up to a maximum of approximately 50 mm, in particular up to a maximum of approximately 35 mm, especially up to a maximum of approximately 25 mm. Therefore, it is ensured that an occupant who is sitting on the vehicle seat is not pressed by the guide device 7.

The guide device 7 guides the bridging section 12 in a single layer and free of folds through the gap 6 upwards in the direction of the seat surface S. It is constructed to release the bridging section 12 in a single layer out from the upper outlet opening 10 upwards to the seat surface S and to guide and/or deflect it in the direction of the distance 11. By the single-layered guidance and the single-layered emergence from the upper outlet opening 10, in an advantageous manner the formation of a dust- and/or crumb fold, in particular in the base position B of the second pad region 3, is avoided. This would be the case with a two- or multi-layered construction or arrangement of the bridging section 12 in the gap 6.

The seat cushion arrangement 1 has a tensioning device 13, which is arranged in a space 14 beneath the first pad region 2. The tensioning device 13 comprises at least one tension spring, on which the bridging section 12 is fastened at a free end projecting out from the lower inlet opening 9. It has a housing 16 in which the tension spring is arranged.

The guide channel 8 is constructed to deflect the bridging section 12 by an angle of at least approximately 70 degrees, preferably at least approximately 80 degrees, especially at least approximately 90 degrees and by a maximum of approximately 130 degrees. On the transfer of the second pad region 3 from the base position B into the distance position A, the bridging section 12 is drawn gradually through the guide channel 8 and out form the upper outlet opening 10. In so doing, it is deflected so that it can bridge the distance 11. On the transfer of the second pad region 3 from the distance position A into the base position B, the bridging section 12 is deflected again and moved through the upper outlet opening 10 into the guide channel 8, in particular is drawn in by the tensioning device 13.

The bridging section 12 is deflected a further time by an angle of at least approximately 70 degrees, preferably at least approximately 80 degrees, especially at least approximately 90 degrees and by a maximum of approximately 130 degrees, when it extends out from the guide channel 8 through the lower inlet opening 9 into the space 14 beneath the first pad region 2. Alternatively or optionally in addition, the bridging section 12 also extends into the housing 16 of the tensioning device 13. In particular, the guide channel 8, the housing 16 of the tensioning device and/or the space 14 forms a receiving space for the bridging section 12, when the second pad region 3 is situated in the base position B.

The tensioning device 13 is constructed to pre-tension the bridging section 12 when the second pad region 3 is transferred from the base position B into the distance position A or when the second pad region 3 occupies the distance position A. By the pre-tensioning, the bridging section can bridge the distance 11 in a manner free of folds. In particular, the formation of a so-called crumb fold is prevented.

When the second pad region 3 is transferred from the distance position A into the base position B, the tensioning device 13 draws the bridging section 12 through the upper outlet opening 10 back into the guide channel 8 and further in the direction of the space 14 beneath the first pad region 2 and/or into the housing of the clamping device 13. In the base position B of the second pad region 3, the tensioning device 13 retains the bridging section 12 in the guide channel 8, in the housing of the tensioning device and/or in the space 14 beneath the first pad region 2 in a tensioned manner.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A seat cushion arrangement for a vehicle seat, comprising:
   a first pad region comprising a first pad cover;
   a second pad region comprising a second pad cover arranged adjacent to the first pad region in a base position; and
   a gap arranged between the first pad region and the second pad region;

wherein the second pad region is configured to transfer relative to the first pad region from the base position into a distance position in which a distance is formed between the first pad region and the second pad region so that the seat cushion arrangement is enlarged in a seat depth, wherein the second pad cover comprises a bridging section that in the distance position of the second pad region is constructed for bridging the distance, wherein the seat cushion arrangement further comprises a guide device for the guidance of the bridging section, wherein the guide device is arranged in the gap between the first pad region and the second pad region, and wherein the guide device is fastened to the first pad region.

2. The seat cushion arrangement according to claim 1, wherein the guide device extends in a longitudinal extent along the gap and comprises a length that is adapted to a seat width of the first pad region.

3. The seat cushion arrangement according to claim 1, wherein the guide device comprises a height that is a pad height of the first pad section.

4. A seat cushion arrangement for a vehicle seat, comprising:
   a first pad region comprising a first pad cover;
   a second pad region comprising a second pad cover arranged adjacent to the first pad region in a base position; and
   a gap arranged between the first pad region and the second pad region;
   wherein the second pad region is configured to transfer relative to the first pad region from the base position into a distance position in which a distance is formed between the first pad region and the second pad region so that the seat cushion arrangement is enlarged in a seat depth,
   wherein the second pad cover comprises a bridging section that in the distance position of the second pad region is constructed for bridging the distance,
   wherein the seat cushion arrangement further comprises a guide device for the guidance of the bridging section,
   wherein the guide device comprises an upper outlet opening through which the bridging section is moved out when the second pad region is transferred into the distance position, and
   wherein the upper outlet opening is arranged offset downwards with respect to a seat surface of the seat cushion arrangement by a maximum of up to approximately 30.

5. The seat cushion arrangement according to claim 4, wherein the guide device is a retaining strip that together with the first pad region forms a guide channel for the bridging section.

6. The seat cushion arrangement according to claim 4, wherein the guide device is a flat housing with a first housing side and a second housing side, wherein the first housing side and the second housing side form a guide channel for the bridging section.

7. The seat cushion arrangement according to claim 4, wherein the guide device is formed from a plastic material.

8. The seat cushion arrangement according to claim 5, wherein the guide channel is constructed for a deflection of the bridging section by an angle of at least approximately 70 degrees.

9. A seat cushion arrangement for a vehicle seat, comprising:
   a first pad region comprising a first pad cover;
   a second pad region comprising a second pad cover arranged adjacent to the first pad region in a base position; and
   a gap arranged between the first pad region and the second pad region;
   wherein the second pad region is configured to transfer relative to the first pad region from the base position into a distance position in which a distance is formed between the first pad region and the second pad region so that the seat cushion arrangement is enlarged in a seat depth,
   wherein the second pad cover comprises a bridging section that in the distance position of the second pad region is constructed for bridging the distance,
   wherein the seat cushion arrangement further comprises a guide device for the guidance of the bridging section, and
   wherein the seat cushion arrangement comprises a tensioning device arranged in a space beneath the first pad region.

10. The seat cushion arrangement according to claim 9, wherein the tensioning device is constructed for pre-tensioning the bridging section when the second pad region is transferred from the base position into the distance position.

11. The seat cushion arrangement according to claim 9, wherein the tensioning device is constructed for guiding the bridging section into the guide channel when the second pad region is transferred from the distance position into the base position.

12. The seat cushion arrangement according to claim 9, wherein the tensioning device is constructed for retaining the bridging section in the guide channel when the second pad region occupies the base position.

13. The seat cushion arrangement according to claim 9, wherein the guide channel and the tensioning device form receiving regions for the bridging section in which the bridging section is received in the base position of the second pad region and from which the bridging section in the distance position of the second pad region projects at least partially and bridges the distance.

* * * * *